United States Patent
Ishii et al.

(10) Patent No.: US 9,849,511 B2
(45) Date of Patent: Dec. 26, 2017

(54) METHOD OF PRODUCING A CU-BASED SINTERED SLIDING MEMBER

(71) Applicant: Diamet Corporation, Niigata-shi (JP)

(72) Inventors: Yoshinari Ishii, Niigata (JP); Tsuneo Maruyama, Niigata (JP); Yoshiki Tamura, Niigata (JP)

(73) Assignee: DIAMET CORPORATION, Niigata-Shi (JP)

( * ) Notice: Subject to any disclaimer, the term of this patent is extended or adjusted under 35 U.S.C. 154(b) by 257 days.

(21) Appl. No.: 14/520,479

(22) Filed: Oct. 22, 2014

(65) Prior Publication Data

US 2015/0037196 A1 Feb. 5, 2015

Related U.S. Application Data

(62) Division of application No. 13/390,883, filed as application No. PCT/JP2010/064565 on Aug. 27, 2010, now abandoned.

(30) Foreign Application Priority Data

Aug. 31, 2009 (JP) ................................. 2009-201072

(51) Int. Cl.
| | |
|---|---|
| B22F 3/26 | (2006.01) |
| C22C 1/04 | (2006.01) |
| C22C 9/02 | (2006.01) |
| C22C 9/06 | (2006.01) |
| C22C 32/00 | (2006.01) |
| F16C 33/12 | (2006.01) |
| B22F 1/00 | (2006.01) |
| B22F 3/12 | (2006.01) |
| B22F 5/00 | (2006.01) |
| B22F 3/24 | (2006.01) |

(52) U.S. Cl.
CPC .............. B22F 3/26 (2013.01); B22F 1/007 (2013.01); B22F 3/12 (2013.01); B22F 5/00 (2013.01); C22C 1/0425 (2013.01); C22C 9/02 (2013.01); C22C 9/06 (2013.01); C22C 32/0084 (2013.01); C22C 32/0089 (2013.01); F16C 33/121 (2013.01); *B22F 2003/248* (2013.01); *B22F 2301/10* (2013.01); *B22F 2302/40* (2013.01); *B22F 2302/45* (2013.01)

(58) Field of Classification Search
CPC .................................. C22C 9/02; C22C 9/06
See application file for complete search history.

(56) References Cited

U.S. PATENT DOCUMENTS

| 2,887,765 | A | * | 5/1959 | Thomson | ............... F16C 33/121 |
|---|---|---|---|---|---|
| | | | | | 420/418 |
| 4,681,629 | A | | 7/1987 | Reinshagen | |
| 5,259,860 | A | | 11/1993 | Ikenoue et al. | |
| 2002/0026855 | A1 | | 3/2002 | Sakai et al. | |
| 2006/0198752 | A1 | * | 9/2006 | Kawase | ................ B22F 3/1003 |
| | | | | | 419/14 |
| 2007/0254180 | A1 | | 11/2007 | Ababneh et al. | |
| 2007/0258668 | A1 | | 11/2007 | Shimizu et al. | |
| 2009/0011268 | A1 | * | 1/2009 | Shimizu | ................ C22C 1/0425 |
| | | | | | 428/550 |
| 2009/0105103 | A1 | * | 4/2009 | Hashida | ............... C10M 169/04 |
| | | | | | 508/386 |
| 2009/0105105 | A1 | * | 4/2009 | Hashida | ............... C10M 169/00 |
| | | | | | 508/555 |

FOREIGN PATENT DOCUMENTS

| JP | 55-145107 | 11/1980 |
|---|---|---|
| JP | 62-156240 | 7/1987 |
| JP | 3-232905 | 10/1991 |
| JP | 4-183805 | 6/1992 |
| JP | 5-195117 | 8/1993 |
| JP | 2004-143580 | 5/2004 |
| JP | 2008-007794 | 1/2008 |
| JP | 2008-007796 | 1/2008 |
| JP | 2008-019929 | 1/2008 |
| JP | 2009-143772 | 7/2009 |

OTHER PUBLICATIONS

International Search Report dated Feb. 8, 2011 for the corresponding PCT Application No. PCT/JP2010/064565.
Office Action dated Jul. 22, 2014 for the U.S. Appl. No. 13/390,883.

* cited by examiner

*Primary Examiner* — Jie Yang
*Assistant Examiner* — Ngoclan T Mai
(74) *Attorney, Agent, or Firm* — Leason Ellis LLP

(57) ABSTRACT

A Cu-based sintered sliding member that can be used under high-load conditions. The sliding member is age-hardened, including 5 to 30 mass % Ni, 5 to 20 mass % Sn, 0.1 to 1.2 mass % P, and the rest including Cu and unavoidable impurities. In the sliding member, an alloy phase containing higher concentrations of Ni, P and Sn than their average concentrations in the whole part of the sliding member, is allowed to be present in a grain boundary of a metallic texture, thereby achieving excellent wear resistance. Hence, without needing expensive hard particles, there can be obtained, at low cost, a Cu-based sintered sliding member usable under high-load conditions. Even more excellent wear resistance is achieved by containing 0.3 to 10 mass % of at least one solid lubricant selected from among graphite, graphite fluoride, molybdenum disulfide, tungsten disulfide, boron nitride, calcium fluoride, talc and magnesium silicate mineral powders.

7 Claims, 1 Drawing Sheet

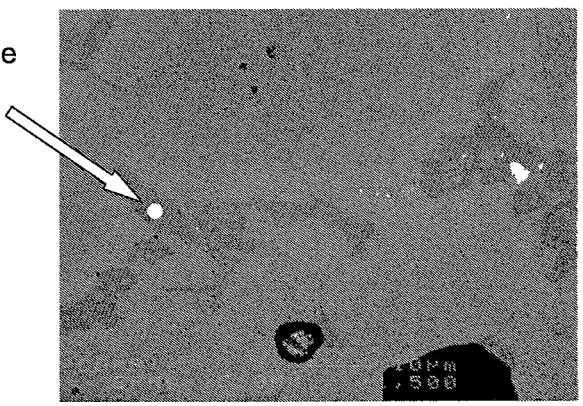
Analyzed Region
φ 1μm in Alloy Phase
of Grain Boundary

METHOD OF PRODUCING A CU-BASED SINTERED SLIDING MEMBER

CROSS-REFERENCE TO RELATED PATENT APPLICATIONS

This application is a Divisional of U.S. patent application Ser. No. 13/390,883, filed Feb. 16, 2012, now abandoned which is a U.S. National Phase Application under 35 U.S.C. §371 of International Patent Application No. PCT/JP2010/064565, filed Aug. 27, 2010, and claims the benefit of Japanese Patent Application No. 2009-201072, filed Aug. 31, 2009, all of which are incorporated by reference herein. The International Application was published in Japanese on Mar. 3, 2011 as International Publication No. WO 2011/024941 under PCT Article 21(2).

FIELD OF THE INVENTION

The present invention relates to a Cu-based sintered sliding member, particularly to a Cu-based sintered sliding member compatible with use under high load conditions.

BACKGROUND OF THE INVENTION

As for bearings used for an automobile, an expensive ball bearing is used for high load applications, such as a bearing for an ABS system of an automobile, while an inexpensive Fe—Cu-based sintered bearing is used for a motor system of an automobile wiper or the like. Due to reduction in size of the motor system, however, the bearing for the motor system is also progressively reduced in size to thereby increase a load applied to the bearing parts. Therefore, ever more excellent performances in wear resistance and seizure resistance are required for the bearing parts.

Recently, to meet strong demands for cost reduction from the market, employing an inexpensive sintered bearing instead of an expensive ball bearing is under consideration even for high load applications such as the foregoing ABS system of the automobile. When using the conventional Cu-based sintered sliding member, however, a load applied thereto is too heavy for it and hence the load exceeds its allowable load range, thus making it impossible to use the member. Further, Fe—Cu based sintered sliding members whose hardness and strength are higher than those of the Cu-based sintered sliding members contain Fe, while a shaft borne by the Cu-based sintered sliding member is also made of an Fe-based metal, and thus, abnormal friction and seizure are likely to occur due to the same-metal phenomenon, even though the probability of the occurrence thereof is low, thus leading to the problem that the reliability thereof as a sliding member is insufficient. Thus, a Cu-based sintered sliding member which is less expensive than the expensive ball bearings and is capable of being used under higher load conditions than in the past has been sought after.

As a conventional art with respect to the Cu-based sintered sliding member usable under high load conditions, there is disclosed a Cu-based sintered sliding member (in e.g., Japanese unexamined patent application publication No. H5-195117) having excellent wear resistance and seizure resistance under high-temperature, high-load and poor-lubrication conditions when it is used for a valve guide or the like of an internal-combustion engine.

The Cu-based sintered alloy according to the conventional art is a Cu—Ni—Sn based alloy whose composition gives rise to a spinodal decomposition through an aging treatment. By undergoing the spinodal decomposition, the Cu—Ni—Sn based alloy is allowed to be formed with a microstructure to thereby strengthen its metallic substrate. Further, through the addition of Ni-based hard particles having excellent adhesiveness to the metallic substrate along with $MoS_2$ as a solid lubricant, wear resistance and seizure resistance are imparted thereto under high-temperature, high-load and poor-lubrication conditions.

The Ni-based hard particles used in the conventional art, however, are not only expensive but a vacuum sintering process is required therefor as Cr is contained in the Ni-based hard particles, thus leading to high manufacturing cost, resulting in an insufficient cost advantage.

SUMMARY OF THE INVENTION

Problem to be Solved by the Invention

Therefore, it is an object of the present invention to provide a Cu-base sintered sliding member which eliminates the need for the addition of expensive hard particles and is capable of being used under high load conditions.

Means for Solving the Problem

A first aspect of the present invention is a Cu-based sintered sliding member, age-hardened and including:
5 to 30% by mass of Ni;
5 to 20% by mass of Sn;
0.1 to 1.2% by mass of P; and
the rest including Cu and unavoidable impurities,
wherein said Cu-based sintered sliding member includes an alloy phase present in a grain boundary of a metallic texture, the alloy phase including higher concentrations of Ni, P and Sn than average concentrations of Ni, P and Sn in the whole sliding member.

A second aspect the present invention is the Cu-based sintered sliding member according to the first aspect, further including 0.3 to 10% by mass of at least one, serving as a solid lubricant, selected from among graphite, graphite fluoride, molybdenum disulfide, tungsten disulfide, boron nitride, calcium fluoride, talc and magnesium silicate mineral powders.

Effects of the Invention

According to the constitution described above, by adding P to the Cu—Ni—Sn based alloy while utilizing a property of the Cu—Ni—Sn based alloy giving rise to hardening by aging treatment, strength of the alloy metallic substrate is further increased, and at the same time, the Ni—P—Cu—Sn alloy phase whose concentration of each of Ni, P and Sn is higher than that of the metallic substrate is allowed to be present in the grain boundary. As a result, there can be obtained the Cu-based sintered sliding member having excellent wear resistance, realizing low-cost production due to no need of the expensive hard particles, and capable of being used under the high-load condition of a bearing used.

Further, addition of the solid lubricant permits the wear resistance to be improved. The solid lubricant may contain one or more substances selected from among graphite, graphite fluoride, molybdenum disulfide, tungsten disulfide, boron nitride, calcium fluoride, talc ($Mg_3SiO_4(OH)_2$) and magnesium silicate ($MgSiO_3$) mineral powders.

BRIEF DESCRIPTION OF THE DRAWING

These and other features and advantages of the present invention will become more readily appreciated when con- FIG. 1 is an electron microscope photograph illustrating an embodiment of the present invention.

DETAILED DESCRIPTION OF THE INVENTION

Mode for Carrying Out the Invention

Preferred embodiments of the present invention are described in detail with reference to the accompanying drawings. The hereinbelow-described embodiments shall not be construed as limiting the subject matter of the present invention set forth in claims. Further, not all features described hereunder are essential requirements of the present invention. In each embodiment, a novel Cu-based sintered sliding member different from the conventional ones is employed so that there can be obtained an unprecedented Cu-based sintered sliding member, the description of which will be given hereinbelow, respectively.

According to the present invention, while taking advantage of such a property of the Cu—Ni—Sn based alloy that it gives rise to hardening by an aging treatment, the alloy metallic substrate is further increased in strength by adding P thereto, and the Ni—P—Cu—Sn alloy phase having higher concentrations of Ni, P and Sn than the metallic substrate is allowed to be present in the grain boundary, thus enabling the excellent wear resistance to be obtained, eliminating the need for the expensive hard particles and thus leading to low cost, whereby there can be obtained the Cu-based sintered sliding member that is capable of being used under the high load usage environment of bearings. Furthermore, adding the solid lubricant agent enable the wear resistance to be improved. As to the property of the Cu—Ni—Sn based alloy giving rise to hardening by an aging treatment, it is known that within a given composition range, Ni and Sn are dissolved in Cu to form a single alpha-phase structure, thus giving rise to a spinodal hardening by an aging treatment. Here, the wording, spinodal hardening, means such phenomenon that due to a structure produced by spinodal decomposition having a periodic structure on the order of several nanometers to thereby form an extremely fine structure, deformation resistance increases by an increase in strain energy or the like, thereby increasing hardness or strength.

Next, a description is given of the reason why the composition of a sintered Cu alloy that constitutes the Cu-based sintered sliding member of the present invention is to be limited.

(a) Ni: 5 to 30% by Mass

Ni, together with P, Sn and Cu, forms a solid solution of a metallic substrate to improve the strength of a sintered alloy by age hardening. Further, an alloy phase whose Ni, P and Sn concentrations are higher than those of the metallic substrate is allowed to be present in the grain boundary, thereby contributing to improving wear resistance. An amount of Ni required for the hardening by aging treatment is at least 5% by mass, while if more than 30% by mass of Ni is added, there is recognized no improvement of hardness attributable to the aging treatment, thus undesirably leading to the opposite effect of an increased raw material cost.

(b) Sn: 5 to 20% by Mass

Sn, together with Ni, P and Cu, forms the solid solution of the metallic substrate to improve the strength of a sintered alloy by age hardening. Further, the alloy phase whose Ni, P and Sn concentrations are higher than those of the metallic substrate is allowed to be present in the grain boundary, thereby contributing to improving wear resistance. An amount of Sn required for the hardening by aging treatment is at least 5% by mass and if more than 20% by mass of Sn is added, there is recognized no improvement of hardness attributable to the aging treatment, thus undesirably leading to the opposite effect of an increased wearing aggressiveness to other materials, (c) P: 0.1 to 1.2% by Mass P improves sintering performance and forms, together with Ni, Sn and Cu, the solid solution of the metallic substrate to improve the strength of a sintered alloy. Further, the alloy phase whose Ni, P and Sn concentrations are higher than those of the metallic substrate is allowed to be present in the grain boundary, thereby contributing to improving wear resistance. When the content of P is less than 0.1% by mass, a predetermined wear resistance cannot be obtained. Contrarily, when the content of P exceeds 1.2% by mass, wearing aggressiveness to a sliding counterpart member is increased, thus undesirably wearing the same.

(d) Solid Lubricant: 0.3 to 10% by Mass

The solid lubricant may contain 0.3 to 10% by mass of at least one of graphite, graphite fluoride, molybdenum disulfide, tungsten disulfide, boron nitride, calcium fluoride, talc ($Mg_3SiO_4(OH)_2$) and magnesium silicate ($MgSiO_3$) mineral powders. When the content of the solid lubricant is less than 0.3% by mass, the improvement in wear resistance cannot be obtained. Contrarily, when the content of the solid lubricant exceeds 10% by mass, its strength noticeably decreases, and thus it is not desirable.

Here, graphite and graphite fluoride are present as free graphite and free graphite fluoride dispersed in the metallic substrate, and impart an excellent lubricating property to a sintered alloy to thereby contribute to the improvement in wear resistance of the sintered alloy. Further, molybdenum disulfide, tungsten disulfide, boron nitride, calcium fluoride, talc ($Mg_3SiO_4(OH)_2$) and magnesium silicate ($MgSiO_3$) mineral powders serve to impart an excellent lubricating property to the sintered alloy and to lessen the chance of metal contact between sliding members, thus contributing to the improvement in wear resistance of the sintered alloy. In addition, talc becomes enstatite after sintering.

Embodiment 1

Next is a description of embodiments with reference to an appended drawing.

In manufacturing the sintered alloy, raw powders are filled in a mold of a required shape and are subjected to powder compacting, thus obtaining a compact with a required density. This compact is sintered in a reductive atmosphere to obtain a sintered alloy. Then, this sintered alloy is subjected to a sizing process to satisfy the required dimensional accuracy using a mold. The size, density, hardness and strength of the sintered alloy after the sizing process are tested to select, as products, ones which have passed the test. Examples of such products include a bearing acting as a sliding member.

Experimental Examples

As raw powders, there were prepared electrolytic Cu powders with 100 mesh diameter, Sn atomized powders with 250 mesh diameter, Cu-based atomized powders including 8% by mass of P with 200 mesh diameter, Cu-based atomized powders including 30% by mass of Ni with 250 mesh diameter, while as additive solid lubricants, there were prepared graphite powders with 20 μm average diameter, molybdenum disulfide powders with less than 150 μm average diameter, calcium fluoride powders with 60 μm average diameter, and talc powders with 20 μm average diameter.

These raw powders were mixed so as to have the final compositions shown in Table 1 and Table 2, to which were added 0.5% by mass of zinc stearate and then mixed together for 20 minutes using a V-type mixer. Thereafter, pressure molding was applied to the mixed compound at a given pressure within 200 to 300 MPa to produce green compacts. Then, these green compacts were sintered at a given temperature within a range of 840 to 940 degrees C. in an atmosphere of an endothermic gas obtained by mixing a natural gas and an air and allowing the same to pass through a heated catalyst to thereby be decomposed and denatured, and then they were subjected to a sizing process, and to an aging treatment for 1 hour in a non-oxidizing atmosphere at a given temperature within 350 to 450 degrees C., followed by impregnating a Cu-based sintered sliding member thus produced with a synthetic oil, whereby ring-shaped test pieces of Cu-based sintered sliding members were produced, said test pieces each having a size of 18 mm outer diameter, 8 mm inner diameter and 8 mm height, and including: a Cu-based sintered sliding member with the ingredient composition shown in Table 1 (hereunder, referred to as an example of the present invention), and for comparison purpose, a Cu-based sintered sliding member with P removed therefrom and a Cu-based sintered sliding member with an ingredient composition departing from that of the example of the present invention (hereunder, referred to as comparative examples). Note that the Cu-based sintered sliding members thus obtained had air holes distributed in their metallic substrates in a proportion of 5 to 25% by mass.

The following tests were performed using the ring-shaped test pieces including Cu-based sintered sliding members 1 to 13 of the present invention (hereunder, referred to as examples 1 to 13 of the present invention), Cu-based sintered sliding members 1 to 13 for comparison purpose (hereunder, referred to as comparative examples 1 to 13), and conventional examples 1, 2 including a Cu-based sintered sliding member subjected to no age hardening and a Fe—Cu-based sintered sliding member. The results of radial crushing tests and wear resistance tests are shown in Tables 1 and 2.

Here, Table 1 shows the examples 1 to 4 of the present invention, the comparative examples 1 to 8, and the conventional examples 1 to 2, while Table 2 shows the examples 5 to 13 of the present invention, and the comparative examples 9 to 13.

Radial Crushing Test:

Load was applied radially to each of the ring-shaped test pieces including the examples 1 to 13 of the present invention, the comparative examples 1 to 13, and the conventional examples 1 to 2. Then, the loads applied to the rings at the moment the ring-shaped test pieces were broken were measured to calculate the strengths thereof. The strengths calculated are shown in a column labeled as "radial crushing strength" in Tables 1, 2.

Wear Resistance Test:

A shaft made of S45C steel was inserted into each of the ring-shaped test pieces including the examples 1 to 13 of the present invention, the comparative examples 1 to 13, and the conventional examples 1 to 2. Then, the test was performed in such a manner that the shaft was rotated at a speed of 75 m/min for 1,000 hours with a load being applied from the outside of the ring-shaped test piece so that the pressure to the surface of the test piece became 1.5 MPa in the radial direction (in the direction perpendicular to the axial direction of the shaft). The maximum abrasion depths after the tests on the respective sliding surfaces of the ring-shaped test pieces and the shafts made of SC45 were measured to evaluate wear resistance. The test results are depicted in Tables 1, 2.

Note that the conditions under which the present wear resistance tests were performed were determined on the assumption of high-load conditions.

TABLE 1

| | | Ingredient Composition (mass %) | | | | Physical Properties after Aging Treatment | | Maximum Abrasion Depth (mm) | Maximum Abrasion Depth of Shaft Material (mm) | With or Without Age Hardening |
|---|---|---|---|---|---|---|---|---|---|---|
| | | Ni | Sn | P | Cu | Radial Crushing Strength (N/mm²) | Hardness (Hv5) | | | |
| Example of the Present Invention | 1 | 9 | 8 | 0.3 | the Rest | 618 | 145 | 0.007 | 0.002 | With |
| | 2 | 7 | 7 | 0.3 | the Rest | 538 | 136 | 0.012 | <0.001 | With |
| | 3 | 12 | 13 | 0.3 | the Rest | 654 | 158 | 0.006 | 0.002 | With |
| | 4 | 25 | 17 | 0.4 | the Rest | 710 | 172 | 0.005 | 0.003 | With |
| Comparative Examples | 1 | 8 | 7 | 0* | the Rest | 491 | 127 | 0.027 | 0.002 | With |
| | 2 | 7 | 7 | 0* | the Rest | 426 | 115 | 0.032 | <0.001 | With |
| | 3 | 12 | 13 | 0* | the Rest | 511 | 132 | 0.022 | 0.001 | With |
| | 4 | 12 | 10 | 1.4* | the Rest | 566 | 174 | 0.005 | 0.023 | With |
| | 5 | 4* | 2 | 0.2 | the Rest | 333 | 51 | 0.097 | 0.001 | With |
| | 6 | 32* | 19 | 1.0 | the Rest | 583 | 146 | 0.020 | 0.007 | With |
| | 7 | 5 | 1* | 0.2 | the Rest | 347 | 49 | 0.104 | 0.001 | With |
| | 8 | 25 | 22* | 0.5 | the Rest | 605 | 149 | 0.008 | 0.021 | With |
| Conventional Examples | 1 | Cu—9% Sn—0.8% C—0.3% P | | | | 300 | 60 | 0.136++ | 0.001++ | Without |
| | 2 | Fe—20% Cu—2% C | | | | 400 | 95 | 0.020 | 0.045 | Without |

(In the table, a * mark indicates the figure is outside the scope of the present invention and a ++ mark indicates measured data after 100 test hours.)

TABLE 2

| | | Ingredient Composition (mass %) | | | | | | | Physical Properties after Aging Treatment | | | Maximum Abrasion Depth of Shaft Material (mm) |
|---|---|---|---|---|---|---|---|---|---|---|---|---|
| | | Ni | Sn | P | C | MoS₂ | CaF₂ | MgSiO₃ | Cu | Radial Crushing Strength (N/mm²) | Hardness (Hv5) | Maximum Abrasion Depth (mm) | |
| Examples of the Present Invention | 5 | 10 | 7 | 0.3 | 2 | 0 | 0 | 0 | the Rest | 536 | 106 | 0.002 | <0.001 |
| | 6 | 7 | 8 | 0.3 | 0 | 2 | 0 | 0 | the Rest | 553 | 110 | 0.003 | <0.001 |
| | 7 | 9 | 7 | 0.4 | 0 | 0 | 2 | 0 | the Rest | 566 | 121 | 0.004 | 0.001 |
| | 8 | 8 | 8 | 0.3 | 0 | 0 | 0 | 2 | the Rest | 540 | 109 | 0.004 | 0.001 |
| | 9 | 6 | 6 | 0.3 | 1 | 0 | 0 | 0 | the Rest | 502 | 102 | 0.007 | <0.001 |
| | 10 | 15 | 13 | 0.7 | 5 | 0 | 0 | 0 | the Rest | 711 | 154 | 0.002 | <0.001 |
| | 11 | 17 | 15 | 0.9 | 7 | 0 | 0 | 0 | the Rest | 697 | 174 | 0.002 | <0.001 |
| | 12 | 20 | 13.5 | 0.5 | 2 | 0 | 0 | 0 | the Rest | 669 | 158 | 0.004 | <0.001 |
| | 13 | 28 | 18 | 1.1 | 1 | 1 | 1 | 1 | the Rest | 645 | 167 | 0.006 | 0.001 |
| Comparative Examples | 9 | 10 | 10 | 0* | 2 | 0 | 0 | 0 | the Rest | 405 | 91 | 0.018 | <0.001 |
| | 10 | 9 | 7 | 0.8 | 11* | 0 | 0 | 0 | the Rest | 255 | 48 | 0.038 | <0.001 |
| | 11 | 10 | 9 | 0.3 | 0 | 12* | 0 | 0 | the Rest | 223 | 44 | 0.064 | <0.001 |
| | 12 | 10 | 9 | 0.3 | 0 | 0 | 11* | 0 | the Rest | 188 | 32 | 0.108 | 0.010 |
| | 13 | 12 | 10 | 1.4* | 0 | 0 | 0 | 11* | the Rest | 159 | 35 | 0.135 | 0.012 |

(In the table, a * mark indicates the figure is outside the scope of the present invention.)

The results shown in Tables 1, 2 indicate that the maximum abrasion depths in the ring-shaped test pieces according to the examples of the present invention were smaller than those in the ring-shaped test pieces including the comparative examples and the conventional examples. Hence, it is learnt that the ring-shaped test pieces according to the present invention have excellent wear resistance. On the other hand, it is learnt from the comparative examples 1 to 13 whose ingredient compositions depart from the scope of the present invention that the ring-shaped test pieces according to the comparative examples 1 to 13 are inferior in respect of at least one characteristic from among strength, wear resistance and wearing aggressiveness to shaft. Table 1 shows that the comparative examples 1 to 3 including less than 0.1% by mass of P had larger maximum abrasion depths than the examples of the present invention, while the comparative example 4 including more than 1.2% by mass of P had larger maximum abrasion depths of the counterpart shaft material as compared to the examples of the present invention; the comparative example 5 including less than 5% by mass of Ni had larger maximum abrasion depths as compared to the examples of the present invention, while the comparative example 6 including more than 30% by mass of Ni had larger maximum abrasion depths as well as larger maximum abrasion depths of the counterpart shaft material as compared to the examples of the present invention; and the comparative example 7 including less than 5% by mass of Sn had larger maximum abrasion depths as compared to the examples of the present invention, while the comparative example 8 including more than 20% by mass of Sn had larger maximum abrasion depths of the counterpart shaft material as compared to the examples of the present invention. Further, it is shown that the comparative examples 1, 2, 3, 5 and 7 had inferior radial crushing strength as compared to the examples of the present invention.

Table 2 shows that the comparative example 9 including less than 0.1% by mass of P, the comparative examples 10 to 12 including more than 10% by mass of the solid lubricant, and the comparative example 13 including more than 10% of the solid lubricant as well as more than 1.2% by mass of P, had inferior radial crushing strength as well as larger maximum abrasion depths, as compared to the examples of the present invention.

The alloy of the example 1 of the present invention was analyzed to determine Ni, P, Sn and Cu within the alloy phase in which the concentration of each of Ni, P and Sn present in the grain boundary of the metallic texture was higher than the average concentration thereof in the whole alloy, using an electron-beam microanalyzer (EPMA). The result obtained is shown in Table 3. An electron microscope photograph (COMPO image) is shown in FIG. 1 as one example of the alloy phase thus analyzed.

TABLE 3

| | Analytical Value (wt %) | | | |
|---|---|---|---|---|
| | Ni | P | Sn | Cu |
| Example 1 of the Present Invention Alloy Phase in Grain Boundary | 64.342 | 10.820 | 14.057 | 9.995 |

With an EPMA analytical condition set at the acceleration voltage of 15 KV and the beam diameter φ of 1 μm, the alloy phase in the grain boundary shown in FIG. 1 was measured at five places. The average value for each metal is shown in Table 3. It is noted from the analysis result that the alloy of the example 1 of the present invention included the specific alloy phase present in the grain boundary, said specific alloy phase including higher Ni, P and Sn concentrations than the average concentrations thereof in the whole sintered alloy.

In addition, the present invention is not limited to the foregoing embodiments and various modifications are possible. For example, whilst the bearing, acting as a sliding member, having a sliding surface in its inner circumferential surface, is described as an example of the present invention in the foregoing embodiments, the Cu-based sintered sliding member according to present invention may be applicable to other sliding members having sliding surfaces.

What is claimed is:
1. A method of producing a Cu-based sintered sliding member comprising the steps of:
   preparing a mixed compound by mixing 5 to 30% by mass of Ni, 5 to 20% by mass of Sn, 0.1 to 1.2% by mass of P and the rest including Cu and unavoidable impurities;
   mixing with the mixed compound 0.3 to 10% by mass of at least one solid lubricant selected from among graph- ite fluoride, tungsten disulfide, calcium fluoride, talc and magnesium silicate mineral powders;

adding 0.5% by mass of zinc stearate to the mixed compound and then mixing together using a V-type mixer;

producing a green compact by pressure molding the resultant mixed compound;

producing a sintered compact by sintering the green compact in an atmosphere of an endothermic gas;

sizing the sintered compact;

allowing the sintered compact to go through an aging treatment in a non-oxidizing atmosphere; and impregnating the Cu-based sintered sliding member with a synthetic oil.

2. The method according to claim 1, wherein the sintered compact goes through the aging treatment for 1 hour at a given temperature within a range from 350 to 450 degrees C.

3. The method according to claim 2, wherein the sintering temperature is within a range from 840 to 940 degrees C.

4. The method according to claim 1, wherein a given pressure for said pressure molding is within a range from 200 to 300 MPa.

5. The method according to claim 4, wherein the sintering temperature is within a range from 840 to 940 degrees C.

6. The method according to claim 1, wherein the sintering temperature is within a range from 840 to 940 degrees C.

7. A method of producing a Cu-based sintered sliding member comprising the steps of:

preparing a mixed compound by mixing 5 to 30% by mass of Ni, 5 to 20% by mass of Sn, 0.1 to 1.2% by mass of P and the rest including Cu and unavoidable impurities;

mixing with the mixed compound 0.3 to 10% by mass of at least one solid lubricant selected from among, graphite fluoride, tungsten disulfide, calcium fluoride, talc and magnesium silicate mineral powders;

adding 0.5% by mass of zinc stearate to the mixed compound and then mixing together for 20 minutes using a V-type mixer;

producing a green compact by pressure molding the resultant mixed compound at a given pressure within a range from 200 to 300 MPa;

producing a sintered compact by sintering the green compact at a given temperature within a range from 840 to 940 degrees C. in an atmosphere of an endothermic gas;

sizing the sintered compact;

allowing the sintered compact to go through an aging treatment for 1 hour in a non-oxidizing atmosphere at a given temperature within a range from 350 to 450 degrees C.; and impregnating the Cu-based sintered sliding member with a synthetic oil.

* * * * *